United States Patent [19]

Tashiro et al.

[11] Patent Number: 5,596,062

[45] Date of Patent: Jan. 21, 1997

[54] SILICON-CONTAINING COPOLYMER AND METHOD OF PRODUCING SAME

[75] Inventors: Yuji Tashiro, Saitama-ken; Kazuo Inoue, Abiko; Tadashi Suzuki, Saitama-ken, all of Japan

[73] Assignee: Tonen Corporation, Japan

[21] Appl. No.: 516,562

[22] Filed: Aug. 18, 1995

[30] Foreign Application Priority Data

Aug. 24, 1994 [JP] Japan .................................. 6-220811
Dec. 27, 1994 [JP] Japan .................................. 6-338588

[51] Int. Cl.$^6$ .................................................. C08G 77/04
[52] U.S. Cl. .................................. 528/28; 528/31; 528/34
[58] Field of Search .............................. 528/28, 31, 34

[56] References Cited

U.S. PATENT DOCUMENTS

| | | | |
|---|---|---|---|
| 3,809,713 | 5/1974 | Boersma et al. | 260/448.2 |
| 5,250,648 | 10/1993 | Huggins | 528/21 |
| 5,268,496 | 12/1993 | Geisberger | 556/412 |

FOREIGN PATENT DOCUMENTS

| | | |
|---|---|---|
| 0361181 | 9/1989 | European Pat. Off. |
| 0511568 | 4/1992 | European Pat. Off. |
| 0572007 | 5/1993 | European Pat. Off. |

Primary Examiner—Melvyn I. Marquis
Attorney, Agent, or Firm—Lorusso & Loud

[57] ABSTRACT

A silicon-containing copolymer is disclosed which has a number average molecular weight of 500–100,000 and which contains the following structural units (I)–(III):

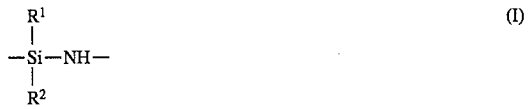

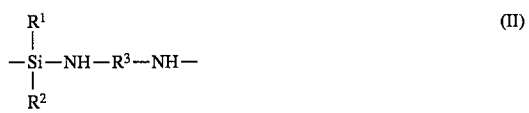

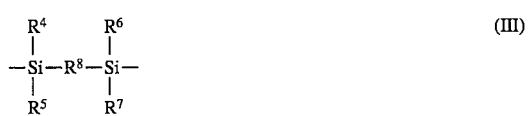

wherein $R^1$, $R^2$, $R^4$, $R^5$, $R^6$ and $R^7$ each represent an alkyl group, an alkenyl group, a cycloalkyl group, an aryl group, an aralkyl group, an alkylamino group or an alkylsilyl group and and $R^3$ and $R^8$ each represent a divalent aromatic group. The copolymer is produced by reacting an organodihalosilane, a disilyl compound, a diamine and ammonia with each other.

9 Claims, No Drawings

SILICON-CONTAINING COPOLYMER AND METHOD OF PRODUCING SAME

BACKGROUND OF THE INVENTION

This invention relates to a novel silicon-containing copolymer useful for forming a heat resistant coating and to a method of producing same As heat resistant polymers, there have been proposed fluorine-containing polymers, polyimides, aromatic polyamides, polyimide bendazols, etc. These polymers, however, cannot show a heat resistance at a temperature of more than 300° C. There are also known highly heat resistant, metal-containing polymers such as metal-containing silicone resins and polymetallosiloxane. These polymers can withstand a high temperature of about 500° C. Because of the large, three-dimensional network structure thereof, however, the metal-containing polymers lack flexibility, so that the use thereof is limited to only specific applications.

JP-A-2-175726 discloses a silazane block copolymer containing inorganic polysilazane sections and organic polysilazane sections. While the silazane copolymer shows both high heat resistance and improved flexibility, the mechanical strengths such as elongation and tensile strength are not satisfactory.

SUMMARY OF THE INVENTION

It is, therefore, an object of the present invention to provide a novel polymer which is devoid of the drawbacks of known heat resistant polymers.

Another object of the present invention is to provide a novel polymer which can give a shaped body, such as an insulation coating, having high heat resistance, high mechanical strength and satisfactory flexibility.

It is a further object of the present invention to provide a method of producing the above novel polymer.

In accomplishing the foregoing objects, there is provided in accordance with the present invention a silicon-containing copolymer having a number average molecular weight of 500–100,000 and containing the following structural units (I)–(III):

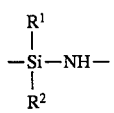
(I)

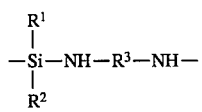
(II)

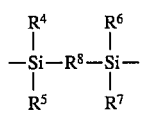
(III)

wherein $R^1$, $R^2$, $R^4$, $R^5$, $R^6$ and $R^7$ stand, independently from each other, for an alkyl group, an alkenyl group, a cycloalkyl group, an aryl group, an aralkyl group, an alkylamino group or an alkylsilyl group and $R^3$ and $R^8$ stand, independently from each other, for a divalent aromatic group, the structural units (I)–(III) being arranged at random and present in molar amounts of p, q and r, respectively, providing the following relationship:
p/q=0.01 to 99
p/r=0.01 to 99.

Because of the presence of aromatic groups $R^3$ and $R^8$, the linearity of the copolymer is improved. Additionally, the aromatic groups have high bonding energy. The Si—N and Si—C bonds have high resistance to oxidation. As a consequence, the copolymer according to the present invention gives a coating having high heat resistance, high mechanical strength and good flexibility.

The above silicon-containing copolymer may additionally contain the following structural units (IV) and (V):

(IV)

(V)

wherein $R^9$ stands for an alkyl group, an alkenyl group, a cycloalkyl group, an aryl group, an aralkyl group, an alkylamino group or an alkylsilyl group and $R^3$ is as defined above. The structural units (I)–(V) are arranged at random and present in molar amounts of p, q, r, m and n, respectively, providing the following relationship:
(m+n)/(p+q)=0.01 to 99
(m+p)/(n+q)=0.01 to 99
r/(m+n+p+q)=0.01 to 99.

In another aspect, the present invention provides a method of preparing the above silicon-containing copolymer, which comprises reacting a mixture containing an organodihalosilane of the following formula (VI):

(VI)

wherein $R^1$ and $R^2$ are as defined above and X is a halogen atom
and a disilyl compound of the following formula (VII):

(VII)

wherein $R^4$, $R^5$, $R^6$, $R^7$ and $R^8$ are as defined above and X represents a halogen atom
with a diamine of the following formula (VIII):

(VIII)

wherein $R^3$ is as defined above and with ammonia.

The present invention also provides a method of preparing the above silicon-containing copolymer, which comprises a first step of reacting an organodihalosilane of the following formula (VI):

(VI)

wherein $R^1$ and $R^2$ are as defined above and X is a halogen atom
with a diamine of the following formula (VIII):

(VIII)

wherein $R^3$ is as defined above and with ammonia to obtain an oligomer, and a second step of reacting the oligomer with a disilyl compound having the following formula (VII):

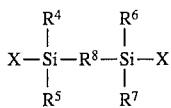

wherein $R^4$, $R^5$, $R^6$, $R^7$ and $R^8$ are as defined above and X represents a halogen atom.

DETAILED DESCRIPTION OF THE PREFERRED EMBODIMENTS OF THE INVENTION

The copolymer according to the present invention has a number average molecular weight of 400–100,000, preferably 500–10,000. The structural units of the above formulas (I)–(III) are arranged at random and present in such molar amounts of p, q and r, respectively, as to establish the following relationship:
p/q=0.01 to 99, preferably 0.1–10
p/r=0.01 to 99, preferably 0.05–20.

When the copolymer contains the structural units of the above formulas (IV) and (V) in addition to those of the formulas (I)–(III), these units (I)–(V) are arranged at random and present in such molar amounts of p, q, r, m and n, respectively, as to establish the following relationship:
(m+n)/(p+q)=0.01 to 99, preferably 0.01–20
(m+p)/(n+q)=0.01 to 99, preferably 0.05–20
r/(m+n+p+q)=0.01 to 99, preferably 0.1–10.

The copolymer of the present invention may be prepared by a one step method or by a two step method.

In one step method, a mixture containing an organodihalosilane of the following formula (VI):

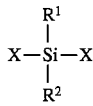

wherein $R^1$ and $R^2$ stand, independently from each other, for an alkyl group, an alkenyl group, a cycloalkyl group, an aryl group, an aralkyl group, an alkylamino group or an alkylsilyl group and X is a halogen atom
and a disilyl compound of the following formula (VII):

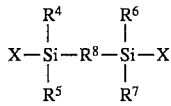

wherein $R^4$, $R^5$, $R^6$ and $R^7$ stand, independently from each other, for an alkyl group, an alkenyl group, a cycloalkyl group, an aryl group, an aralkyl group, an alkylamino group or an alkylsilyl group,
$R^8$ stands for a divalent aromatic group and
X represents a halogen atom is reacted with a diamine of the following formula (VIII):

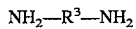

wherein $R^3$ represents a divalent organic group and with ammonia.

In the above formulas (VI) and (VII), $R^1$, $R^2$, $R^4$, $R^5$, $R^6$ and $R^7$ are each preferably an alkyl group having 1–7, more preferably 1–5, most preferably 1–2 carbon atoms; an alkenyl group having 2–7 carbon atoms, a cycloalkyl group having 5–7 carbon atoms, an aralkyl group, aryl group, an alkylsilyl group (mono, di or trialkyl) having 1–7 carbon atoms, an alkylamino group (mono, di or trialkyl) having 1–7 carbon atoms and alkoxy group having 1–7 carbon atoms. Examples of suitable aryl and aralkyl groups include a phenyl group, a tolyl group, a xylyl group, a cumenyl group, a benzyl group, a phenethyl group, an α-methylbenzyl group, a diphenylmethyl group, a triphenylmethyl group, a styryl group, a cinnamyl group, a biphenyl group and a naphthyl group. The halogen atom X is preferably fluorine, chlorine, bromine or iodine, more preferably chlorine.

The divalent organic group $R^8$ (and R3 of the formula (VIII)) is preferably an aralkylene group (alkylene group having one or more aryl groups), a naphthylene group or a group of the formula:

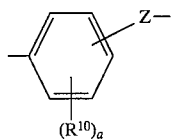

wherein $R^{10}$ represents a halogen atom or a lower alkyl group, a is an integer of 0–4 and Z represents a direct bond or

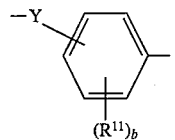

wherein $R^{11}$ represents a halogen atom or a lower alkyl group, b is an integer of 0–4 and Y is a direct bond or a divalent group.

The divalent group Y of the above formula may be, for example, $-CH_2-$, $-CO-$, $-O-$, $-S-$, $-SO_2-$, $-O-Ph-O-$, $-O-Ph-Ph-O-$, $-O-Ph-SO_2-Ph-O-$, $-C(CH_3)_2-Ph-C(CH_3)_2$, $-O-Ph-C(CH_3)_2-Ph-O-$ or $-O-Ph-C(CF_3)_2-Ph-O-$ where Ph represents a paraphenylene group or a metaphenylene group.

Illustrative of suitable aralkylene groups are a benzylidene group, a phenethylene group, an α-methylbenzylidene group and a cynnamylidene group.

Illustrative of suitable diamine of the formula (VIII) are shown below:

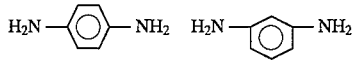

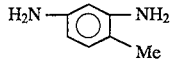

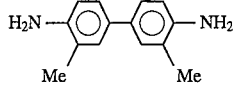

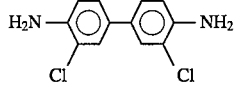

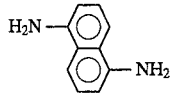

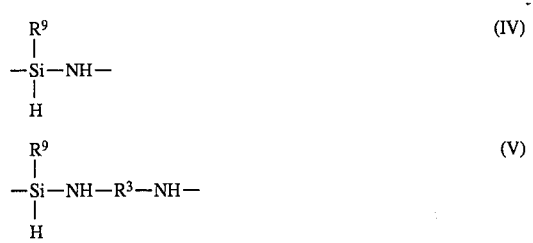

$H_2N-\text{C}_6H_4-CH_2-\text{C}_6H_4-NH_2$ $H_2N-\text{C}_6H_3(Cl)-CH_2-\text{C}_6H_3(Cl)-NH_2$ $H_2N-\text{C}_6H_4-CO-\text{C}_6H_4-NH_2$ $H_2N-\text{C}_6H_4-CO-\text{C}_6H_4-NH_2$ $H_2N-\text{C}_6H_4-O-\text{C}_6H_4-NH_2$ $H_2N-\text{C}_6H_4-O-\text{C}_6H_4-NH_2$ $H_2N-\text{C}_6H_4-S-\text{C}_6H_4-NH_2$ $H_2N-\text{C}_6H_4-SO_2-\text{C}_6H_4-NH_2$ $H_2N-\text{C}_6H_4-SO_2-\text{C}_6H_4-NH_2$ $H_2N-\text{C}_6H_4-C(Me)_2-\text{C}_6H_4-C(Me)_2-\text{C}_6H_4-NH_2$ $H_2N-\text{C}_6H_4-C(Me)_2-\text{C}_6H_4-C(Me)_2-\text{C}_6H_4-NH_2$ $H_2N-\text{C}_6H_4-O-\text{C}_6H_4-O-\text{C}_6H_4-NH_2$ $H_2N-\text{C}_6H_4-O-\text{C}_6H_4-O-\text{C}_6H_4-NH_2$ $H_2N-\text{C}_6H_4-O-\text{C}_6H_4-\text{C}_6H_4-O-\text{C}_6H_4-NH_2$ $H_2N-\text{C}_6H_4-O-\text{C}_6H_4-C(Me)_2-\text{C}_6H_4-O-\text{C}_6H_4-NH_2$ $H_2N-\text{C}_6H_4-O-\text{C}_6H_4-C(CF_3)_2-\text{C}_6H_4-O-\text{C}_6H_4-NH_2$ $H_2N-\text{C}_6H_4-O-\text{C}_6H_4-SO_2-\text{C}_6H_4-O-\text{C}_6H_4-NH_2$ If desired, an organohydrodihalosilane of the formula (IX):

$$\begin{array}{c} R^9 \\ | \\ X-Si-X \\ | \\ H \end{array} \quad (IX)$$

wherein $R^9$ stands for an alkyl group, an alkenyl group, a cycloalkyl group, an aryl group, an alkylamino group or an alkylsilyl group, may be incorporated into the mixture of the organodihalosilane of the formula (VI) and the disilyl compound of the formula (VII). In this case, the silicon-containing copolymer produced additionally contains the following structural units (IV) and (V):

$$\begin{array}{c} R^9 \\ | \\ -Si-NH- \\ | \\ H \end{array} \quad (IV)$$

$$\begin{array}{c} R^9 \\ | \\ -Si-NH-R^3-NH- \\ | \\ H \end{array} \quad (V)$$

wherein $R^9$ and $R^3$ are as defined above.

In the one-step method according to the present invention, the above mixture containing the compounds (VI), (VII) and, optionally (IX) is preferably first reacted with the diamine (VIII) in a solvent. The molar ratio of the organodihalosilane (VI) to the disilyl compound (VII) is generally 99:1 to 1:99, preferably 90:10 to 10:90, more preferably 80:20 to 40:60. When the organohydrodihalosilane of the formula (IX) is further incorporated into the mixture, the molar ratio of the organohydrodihalosilane (IX) to the organodihalosilane (VI) is generally 1:99 to 99:1, preferably 10:90 to 90:10. The molar ratio of the diamine (VIII) to the mixture of the compounds (VI), (VII) and optionally (IX) is generally 10:90 to 90:10, preferably 12.5:87.5 to 75:25, more preferably 25:75 to 60:40. The molar amount $M_1$ of the diamine is less than the stoichiometric molar amount $M_0$ and preferably such that 25–75 mole % of the mixture is reacted with the diamine in the above reaction stage.

The solvent may be a Lewis base, an inert solvent or a mixture thereof.

Examples of the Lewis base include tertiary amines such as trialkylamines (e.g. trimethylamine, triethylamine, dimethylethylamine and diethylmethylamine), pyridine, picoline, N-methyl-2-pyrrolidone, dimethylaniline and derivatives thereof; secondary amines having bulky groups; phosphine and derivatives thereof such as trimethylphosphine, dimethylethylphosphine, methyldiethylphosphine and triethylphosphine; arsine and derivatives thereof such as trimethylarsine; and stibine and derivatives thereof such as trimethylstibine. Above all, the use of a relatively low boiling point Lewis base having lower basicity than ammonia such as pyridine, picoline, trimethylphosphine, dimethylethylphosphine, methyldiethylphosphine or triethylphosphine, especially pyridine or picoline, is preferred.

Examples of inert solvents include hydrocarbon solvents such as aliphatic hydrocarbons, alicyclic hydrocarbons and aromatic hydrocarbons; halogenated hydrocarbons such as halogenated methanes, halogenated ethanes and halogenated benzenes; and ethers such as aliphatic ethers and alicyclic ethers. Illustrative of suitable inert solvent are halogenated hydrocarbons such as methylene chloride, chloroform, carbon tetrachloride, bromoform, ethylene chloride, ethylidene chloride, trichloroethane and tetrachloroethane; ethers such as ethyl ether, isopropyl ether, ethyl butyl ether, butyl ether, 1,2-dioxyethane, dioxane, dimethyldioxane, tetrahydrofuran, diglyme or tetrahydropyrane; and hydrocarbons such as pentane, hexane, isohexane, methylpentane, heptane, isoheptane, octane, isooctane, cyclopentane, methylcyclopentane, cyclohexane, methylcyclohexane, benzene, toluene, xylene and ethylbenzene.

Above all, the use of dichloromethane, xylene, N-methyl-2-pyrrolidone, pyridine or a mixture thereof is preferred.

The reaction of the mixture with the diamine is performed at a temperature so that the reaction system is maintained in a liquid phase and, generally, at −40° C. to 300° C. The reaction pressure is ambient pressure or higher. Preferably, the reaction is carried out in a nitrogen atmosphere.

The thus obtained reaction product (intermediate product) is then reacted with ammonia. The reaction solvent and conditions may be the same as those adopted in the reaction of the mixture of the compounds (VI) and (VII) with the diamine. Thus, it is not necessary to isolate the intermediate product. Rather, it is preferred that the reaction mixture obtained by the reaction of the compounds (VI) and (VII) with the diamine as such be reacted with ammonia.

The molar amount $M_2$ of the ammonia is at least $(M_0-M_1)$ moles. Preferably, the reaction is carried out in a nitrogen atmosphere. During the course of the reaction, HCl is produced. The HCl may be fixed as a salt with, for example, triethylamine or ammonia. The resulting copolymer may be separated from the salt by, for example, filtration. The solvent may be removed by distillation. The copolymer is generally soluble in various solvents such as aliphatic hydrocarbons, alicyclic hydrocarbons, halogenated hydrocarbons, aromatic hydrocarbons, alcohols, esters, ketones and ethers.

In the two step method, an organodihalosilane of the formula (VI):

wherein X, $R^1$ and $R^2$ are as defined above is first reacted with a diamine of the formula (VIII):

wherein $R^3$ is as defined above and with ammonia to obtain an oligomer (first step). The oligomer is then reacted with a disilyl compound having the formula (VII):

wherein X $R^4$, $R^5$, $R^6$, $R^7$ and $R^8$ are as defined above (second step).

If desired, an organohydrodihalosilane of the formula (IX):

wherein $R^9$ is as defined above may be reacted with the diamine, in the first step, together with the organodiahalosilane of the formula (VI).

In the two-step method according to the present invention, the organodihalosilane (VI) and, optionally organohydrodihalosilane (IX), are preferably first reacted with the diamine (VIII) in absolvent. The molar ratio of the compound (VI) to the compound (IX) is generally 1:99 to 99:1, preferably 10:90 to 90:10. The molar ratio of the diamine (VIII) to the compound (VI) (or a mixture of the compounds (VI) and (IX)) is generally 1:99 to 99:1, preferably 50:50 to 10:90. The molar amount $M_3$ of the diamine is less than the stoichiometric molar amount $M_0$ and preferably such that 10–50 mole % of the mixture is reacted with the diamine in the above reaction stage. The solvent may be a Lewis base, an inert solvent or a mixture thereof, which may be the same as described previously with reference to the one step method.

The above reaction with the diamine is performed at a temperature so that the reaction system is maintained in a liquid phase and, generally, at −40° C. to 160° C. The reaction pressure is ambient pressure or higher. Preferably, the reaction is carried out in a nitrogen atmosphere.

The thus obtained reaction product (intermediate product) is then reacted with ammonia. The reaction solvent and conditions may be the same as those adopted in the reaction with the diamine. Thus, it is not necessary to isolate the intermediate product. Rather, it is preferred that the reaction mixture obtained by the reaction of the compounds (VI) and, optionally, (IX) with the diamine as such be reacted with ammonia.

The molar amount $M_4$ of the ammonia is at least $(M_0-M_3)$ moles. The thus obtained silazane oligomer is separated from by-product ammonium chloride.

The oligomer is then reacted with a disilyl compound of the formula (VII) in a solvent. The molar ratio of the oligomer to the disilyl compound (VII) is generally 1:99 to 99:1, preferably 10:90 to 90:10. The solvent may be a Lewis base, an inert solvent or a mixture thereof, which may be the same as described previously with reference to the one step method.

The above reaction of the oligomer with the disilyl compound is performed at a temperature of 0° C. to 300° C., preferably 20° C. to 200° C. The reaction pressure is ambient pressure or higher. Preferably, the reaction is carried out in a nitrogen atmosphere. During the course of the reaction, HCl is produced. The HCl may be fixed as a salt with, for example, triethylamine or ammonia. The resulting copolymer may be separated from the salt by, for example, filtration. The solvent may be removed by distillation.

The copolymer obtained by the above one or two step method is generally soluble in various solvents such as aliphatic hydrocarbons, alicyclic hydrocarbons, halogenated hydrocarbons, aromatic hydrocarbons and ethers.

The thus obtained copolymer according to the present invention may be used for forming a shaped body having a high heat resistance and excellent mechanical properties. For example, when the copolymer is applied to a surface of a substrate such as a metal wire and the resulting coating is heated in air at a temperature of 250°–400° C. for 3 minutes to 2 hours, a film which withstands a high temperature and which shows high mechanical properties and flexibility may be obtained. When the resultant layer is further calcined in an inert gas atmosphere such as nitrogen and argon at a temperature of 400°–500° C. for 0.1–2 hours, the heat resistance of the film may be further improved.

The following examples will further illustrate the present invention.

EXAMPLE 1

Into a reactor which had been placed in a thermostatic chamber and whose inside atmosphere had been replaced with dry nitrogen gas, 200 ml of xylene and 7.5 g (0.069 mole) of paraphenylenediamine ($H_2N$—Ph—$NH_2$) were charged. The reactor was heated to 120° C. to dissolve the paraphenylenediamine. To this solution was added, in 15 minutes, a solution of 25.3 g (0.1 mole) of diphenyldichlorosilane ($Ph_2SiCl_2$), 0.75 g (0.0065 mole) of methyldichlorosilane ($CH_3SiHCl_2$) and 6.6 g (0.025 mole) of 1,4-bis(dimethylchlorosilyl)benzene (($CH_3)_2ClSi$—Ph—Si($CH_3)_2Cl$) dissolved in 100 ml of xylene, while maintaining the mixture in the reactor at 120° C. White precipitates of salts of paraphenylenediamine were found to form.

To fix the hydrogen chloride and hydrochlorides formed in situ, 60 ml of triethylamine was fed to the reactor. The reactor was then cooled to below 30° C. and 12 g of ammonia were introduced into the reactor to react the remaining dihalosilanes with ammonia. White precipitates of ammonium chloride was found to form with the simultaneous elevation of the reaction mixture. After the completion of the reaction, dry nitrogen gas was fed to the reactor to purge the unreacted ammonia. The reaction mixture was filtered in the atmosphere of nitrogen to obtain about 350 ml of a filtrate, from which the solvent was removed in vacuo, thereby to leave 30 g of red brown solid of a copolymer in the form of a solid.

The gel permeation chromatography revealed that the copolymer thus obtained had a number average molecular weight of 700. The IR spectrum of the copolymer showed an absorption peak based on NH at wave numbers of 3,350 $cm^{-1}$, a peak based on Si—H at 2,170 $cm^{-1}$, a peak based on Si—Ph at 1,140 $cm^{-1}$, a broad peak based on Si—N—Si and Si—H at 1,020–820 $cm^{-1}$, peaks based on C—H at 3,140, 2,980, 2,950 and 1,270 $cm^{-1}$, and peaks based on phenyl C—H at 810 and 780 $cm^{-1}$. The $^1$HNMR (proton nuclear magnetic resonance) spectrum of this copolymer indicated peaks at δ of 7.2 ppm (br, $C_6H_6$), δ of 4.8 ppm (br, SiH), δ of 1.4 ppm (br, NH) and δ of 0.3 ppm (br, $SiCH_3$). The $^{29}$SiNMR spectrum (NON—NOE BB—DC) of the copolymer showed peaks attributed to —$CH_3SiH$—NH— and —$CH_3SiH$—NH—Ph—NH— at −17 ppm and −20 to −25 ppm, peaks attributed to —$SiPh_2$—NH— and —$SiPh_2$—NH—Ph—NH— at −25 to −35 ppm and peaks attributed to —$(CH_3)_2Si$—Ph—$Si(CH_3)_2$— at −2 to −8 ppm. The $^{15}$NNMR spectrum (DEPT90) of the copolymer showed peaks attributed to —NH—Ph—NH— at 50–65 ppm and peaks attributed to —NH— derived from ammonia at 20–40 ppm. From the peak areas of respective absorption peaks, the copolymer is considered to be composed of the following constituting units:

—($CH_3SiH$—NH)$_m$—,  —($CH_3SiH$—NH—Ph—NH)$_n$—,
—($SiPh_2$—NH)$_p$—,  —($SiPh_2$—NH—Ph—NH)$_q$— and
—(($CH_3)_2Si$—Ph—$Si(CH_3)_2$)$_r$— wherein m, n, p, q and r provide the following molar ratios:

(m+n)/(p+q)=0.09, (m+p)/(n+q)=0.58 and r/(m+n+p+q)=0.40.

The copolymer thus obtained was applied onto a flat metal plate and hardened at 350° C. for 2 hours in air to form a film having a thickness of about 30–50 μm thereon. The film was found to have a tensile strength of 560 kgf/cm$^2$ and an elongation of 11% and to show a weight loss of 5% when heated at 500° C. in air.

The copolymer was applied to a nickel-plated copper wire having a diameter of 2.4 mm. The thickness of the copolymer coating was 10 μm. The coating was tested for the flexibility. Thus, the coated wire was calcined at 350° C. to harden the coating. The resulting wire was then wound around rigid rods having various different diameters of n×D, where D is the diameter of the copper wire (2.4 mm) and n is an integer, while checking whether or not cracks were formed in the coated layer. It was found that the smallest number of n of the rod with which no cracking was caused is 1.

The coating of the copper wire was also tested for the heat-resistance thereof. Thus, the coated wire was heated at 400° C. for 6 hours in air and observed with a microscope with 400 magnification. The film revealed no cracks. Even when the coated wire was further heated at 600° C. for 1 hours in air, no change was observed.

EXAMPLES 2–12

Example 1 was repeated in the same manner as described except that the amounts of the silicon compounds, the kind and amount of the diamine and/or the reaction conditions were changed as shown in Table 1 below. The copolymers thus obtained were tested for their properties in the same manner as that in Example 1. The results are shown in Table 2 together with those of Example 1.

TABLE 1

| Example | Molar Ratios of Silicon Compounds | | | Diamine | | Solvent | Reaction Temperature (°C.) |
|---|---|---|---|---|---|---|---|
| | DFC*1 | MCS*2 | BDB*3 | kind | amount (mole %)*4 | | |
| 1 | 76 | 5 | 19 | PDA*5 | 50 | xylene | 120 |
| 2 | 80 | 0 | 20 | PDA | 50 | NMP*6 | 160 |
| 3 | 72 | 10 | 18 | PDA | 50 | NMP | 160 |
| 4 | 76 | 5 | 19 | PDA | 25 | xylene | 120 |
| 5 | 80 | 0 | 20 | PDA | 25 | xylene | 120 |
| 6 | 72 | 10 | 18 | PDA | 25 | xylene | 120 |
| 7 | 76 | 5 | 19 | PDA | 10 | xylene | 120 |
| 8 | 76 | 5 | 19 | DDE*7 | 50 | NMP | 160 |
| 9 | 80 | 0 | 20 | DDE | 50 | NMP | 160 |
| 10 | 80 | 0 | 20 | PDA/DDE | 25/25 | NMP | 160 |
| 11 | 20 | 0 | 80 | PDA | 50 | NMP | 160 |
| 12 | 5 | 76 | 19 | PDA | 50 | xylene | 120 |

*1: diphenyldichlorosilane
*2: methyldichlorosilane
*3: 1,4-bis(dimethylchlorosilyl)benzene
*4: based on the total molar amount of the silicon compounds
*5: p-phenylenediamine
*6: N-methyl-2-pyrrolidone
*7: diaminodiphenyl ether

TABLE 2

| Example | Heat Resistance (°C.)*1 | Tensile Strength (kgf/cm$^2$) | Elongation (%) | Flexibility n*2 |
|---|---|---|---|---|
| 1 | 500 | 560 | 11 | 1 |
| 2 | 505 | 20 | 100 | 1 |
| 3 | 500 | 50 | 90 | 1 |
| 4 | 500 | 700 | 12 | 1 |

TABLE 2-continued

| Example | Heat Resistance (°C.)*1 | Tensile Strength (kgf/cm$^2$) | Elongation (%) | Flexibility n*2 |
|---|---|---|---|---|
| 5 | 500 | 400 | 12 | 1 |
| 6 | 500 | 480 | 13 | 1 |
| 7 | 500 | 300 | 8 | 3 |
| 8 | 500 | 20 | 70 | 1 |
| 9 | 500 | 35 | 50 | 1 |
| 10 | 500 | 250 | 8 | 2 |
| 11 | 510 | 300 | 30 | 1 |
| 12 | 510 | 400 | 5 | 5 |

*1: temperature providing a weight loss of 5%
*2: the smallest number of n of the rod with which cracks were not observed

EXAMPLE 13

Into a reactor which had been placed in a thermostatic chamber maintained at −40° C. and whose inside atmosphere had been replaced with dry nitrogen gas, 1000 ml of methylene chloride and 80 ml of pyridine were introduced. With stirring, 47.6 g (0.413 mole) of methyldichlorosilane and 25.3 g (0.10 mole) of diphenyldichlorosilane were added to the reactor. After a temperature of −40° C. had been reached, a solution containing 25 g (0.125 mole) of diaminodiphenyl ether (H$_2$N—Ph—O—Ph—NH$_2$) dissolved in 100 g of pyridine was slowly introduced into the reactor at a rate of about 5 g/minute. Thereafter, 20 g of ammonia was added to the reactor. After the completion of the reaction, dry nitrogen gas was fed to the reactor to purge the unreacted ammonia. The reaction mixture was filtered under pressure in the atmosphere of nitrogen to obtain about 1,150 ml of a filtrate. The filtrate was mixed with 1,000 ml of dry m-xylene. Thereafter, the solvent was removed in vacuo, thereby to leave 45 g of red brown viscous liquid as an oligomer.

The gel permeation chromatography revealed that the oligomer had a number average molecular weight of 850. The IR spectrum of the copolymer showed an absorption peak based on NH at wave numbers of 3,350 cm$^{-1}$, a peak based on N—H at 2,170 cm$^{-1}$, a peak based on Si—Ph at 1,140 cm$^{-1}$, a broad peak based on Si—N—Si and Si—H at 1,020–820 cm$^{-1}$ and peaks based on C—H at 3,140, 2,980, 2,950 and 1,270 cm$^{-1}$. The $^1$HNMR spectrum of this oligomer indicated peaks at δ of 7.2 ppm (br, C$_6$H$_6$), δ of 4.8 ppm (br, SiH$_2$ or SiH), δ of 1.4 ppm (br, NH) and δ of 0.3 ppm (br, SiCH$_3$).

The oligomer (40 g) was dissolved in m-xylene and the solution was charged in a reactor and heated to 150° C. With stirring, a solution containing 40 g (0.152 mole) of 1,4-bis(dimethylchlorosilyl)benzene dissolved in 300 ml of m-xylene was gradually added to the reactor. When a temperature of 90° C. was reached, 20 ml of triethylamine was fed to the reactor to trap the hydrogen chloride formed in situ. When the temperature decreased to room temperature, 5.0 g of ammonia was introduced into the reactor to effect the ammonolysis of the remaining 1,4-bis(dimethylchlorosilyl)benzene. After the completion of the reaction, dry nitrogen gas was fed to the reactor to purge the unreacted ammonia. The reaction mixture was filtered in the atmosphere of nitrogen to obtain about 800 ml of a filtrate, from which the solvent was removed in vacuo, thereby to leave 75 g of red brown viscous liquid of a copolymer.

The gel permeation chromatography revealed that the copolymer thus obtained had a number average molecular weight of 2,000. The IR spectrum of the copolymer showed that the intensity of the peak at 820 cm$^{-1}$ attributed to —Ph—Si— was increased. The $^1$HNMR spectrum of this copolymer indicated that the intensity of the peaks at δ of 7.2 ppm (br, C$_6$H$_6$) was also increased. The $^{29}$SiNMR spectrum (NON—NOE BB—DC and DEPT90) of the copolymer showed peaks attributed to —CH$_3$SiH—NH— and —CH$_3$SiH—NH—Ph—O—Ph—NH— at −15 to −25 ppm, peaks attributed to —SiPh$_2$—NH— and —SiPh$_2$—NH—Ph—O—Ph—NH— at −30 to −35 ppm and peaks attributed to –(CH$_3$)$_2$Si—Ph—Si(CH$_3$)$_2$— at −2 to −5 ppm. The $^{15}$NNMR spectrum (DEPT90) of the copolymer showed peaks attributed to —NH—Ph—O—Ph—NH— at 60 ppm and peaks attributed to —NH— derived from ammonia at 20–40 ppm. From the peak areas of respective absorption peaks, the copolymer is considered to be composed of the following constituting units:
—(CH$_3$SiH—NH)$_m$—, —(CH$_3$SiH—NH—Ph—NH)$_n$—, —(SiPh$_2$—NH)$_p$—, —(SiPh$_2$—NH—Ph—NH)$_q$— and —((CH$_3$)$_2$Si—Ph—Si(CH$_3$)$_2$)$_r$— wherein m, n, p, q and r provide the following molar ratios:
(m+n)/(p+q)=7.2,
(m+p)/(n+q)=5.1 and
r/(m+n+p+q)=2.3.

The copolymer thus obtained was applied onto a flat metal plate and hardened at 300° C. for 2 hours in air to form a film having a thickness of about 30–50 μm thereon. The film was found to have a tensile strength of 450 kgf/cm$^2$ and an elongation of 8% and to show a weight loss of 5% when heated at 450° C. in air. The copolymer was also hardened at 500° C. for 2 hours in a nitrogen atmosphere to form a film having a thickness of about 30–50 μm thereon. The film was found to have a tensile strength of 580 kgf/cm$^2$ and an elongation of 12% and to show a weight loss of 5% when heated at 500° C. in air.

The copolymer was applied to a nickel-plated copper wire having a diameter of 2.4 mm and the coating was tested for the heat resistance. Thus, the coated wire was calcined at 400° C. for 6 hours in air. The film revealed no cracks.

EXAMPLE 14–23

Example 13 was repeated in the same manner as described except that the amounts of the silicon compounds, the kind and amount of the diamine and/or the reaction conditions were changed as shown in Tables 3-1 and 3-2 below. The copolymers thus obtained were tested for their properties in the same manner as that in Example 13. The results are shown in Table 4 together with those of Example 13.

TABLE 3-1

| Example | Monomers | | | Diamine | | Temperature in 1st step (°C.) |
|---|---|---|---|---|---|---|
| | I | II | I/II | Kind | Amount (mole %)*1 | |
| 13 | A*2 | B*3 | 8/2 | DDE*5 | 25 | −40 |
| 14 | A | B | 8/2 | DDE | 50 | −40 |
| 15 | A | B | 8/2 | DDE | 90 | 0 |
| 16 | A | B | 9/1 | DDE | 25 | −40 |
| 17 | A | B | 5/5 | DDE | 25 | −40 |
| 18 | A | B | 8/2 | pPDA*6 | 25 | −40 |
| 19 | A | B | 8/2 | mPDA*7 | 25 | 0 |
| 20 | A | B | 8/2 | DDE | 25 | −40 |
| 21 | A | B | 8/2 | DDE | 25 | −40 |
| 22 | A | C*4 | 8/2 | DDE | 25 | −40 |
| 23 | A | B | 8/2 | DDK*8 | 25 | −40 |

TABLE 3-1-continued

| Exam-ple | Monomers I | II | I/II | Diamine Kind | Amount (mole %)*1 | Temperature in 1st step (°C.) |
|---|---|---|---|---|---|---|

*1: based on the total molar amount of the silicon compounds
*2: methyldichlorosilane
*3: diphenyldichlorosilane
*4: dimethyldichlorosilane
*5: diaminodiphenyl ether
*6: p-phenylenediamine
*7: m-phenylenediamine
*8: diaminodiphenyl ketone

TABLE 3-2

| Example | Disilyl Compound Kind | Concentration (wt %) | Temperature in 2nd step (°C.) |
|---|---|---|---|
| 13 | BDB*1 | 50 | 150 |
| 14 | BDB | 50 | 150 |
| 15 | BDB | 50 | 150 |
| 16 | BDB | 50 | 150 |
| 17 | BDB | 50 | 180 |
| 18 | BDB | 50 | 150 |
| 19 | BDB | 50 | 120 |
| 20 | BDB | 10 | 150 |
| 21 | BDE*2 | 50 | 150 |
| 22 | BDB | 50 | 150 |
| 23 | BDB | 50 | 150 |

*1: 1,4-bis(dimethylchlorosilyl)benzene
*2: 1,4-bis(dimethylchlorosilyl)ethane

TABLE 4

| Example | Heat Resistance (°C.)*1 I*2 | II*3 | Tensile Strength (kgf/cm²) I*2 | II*3 | Elongation (%) I*2 | II*3 |
|---|---|---|---|---|---|---|
| 13 | 500 | 450 | 450 | 580 | 8 | 12.0 |
| 14 | 500 | 440 | 420 | 450 | 5 | 7.0 |
| 15 | 500 | 450 | 480 | 490 | 5 | 7.0 |
| 16 | 500 | 450 | 400 | 500 | 4.0 | 6.0 |
| 17 | 505 | 460 | 420 | 480 | 5.0 | 7.2 |
| 18 | 510 | 420 | 380 | 450 | 6.0 | 8.2 |
| 19 | 505 | 425 | 390 | 450 | 6.2 | 8.1 |
| 20 | 500 | 410 | 400 | 420 | 5.8 | 6.0 |
| 21 | 500 | 440 | 400 | 410 | 5.7 | 7.5 |
| 22 | 490 | 410 | 400 | 460 | 5.2 | 7.1 |
| 23 | 490 | 450 | 410 | 490 | 4.8 | 7.5 |

*1: temperature providing a weight loss of 5%
*2: hardened at 300° C. in air
*3: hardened at 500° C. in nitrogen atmosphere

What is claimed is:

1. A silicon-containing copolymer having a number average molecular weight of 500–100,000 and containing the following structural units (I)–(III):

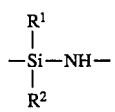
(I)

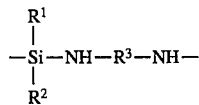
(II)

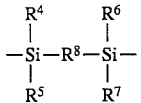
(III)

wherein $R^1$, $R^2$, $R^4$, $R^5$, $R^6$ and $R^7$ stand, independently from each other, for an alkyl group, an alkenyl group, a cycloalkyl group, an aryl group, an aralkyl group, an alkylamino group or an alkylsilyl group and and $R^3$ and $R^8$ stand, independently from each other, for a divalent aromatic group, said structural units (I)–(III) being arranged at random and present in molar amounts of p, q and r, respectively, providing the following relationship:

p/q=0.01 to 99 p/r=0.01 to 99.

2. A silicon-containing copolymer as claimed in claim 1, wherein said divalent aromatic group is an aralkylene group, a naphthylene group or a group of the formula:

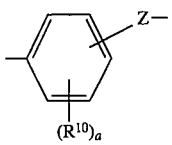

wherein $R^{10}$ represents a halogen atom and a lower alkyl group, a is an integer of 0–4 and Z represents a direct bond or

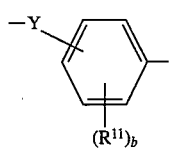

wherein $R^{11}$ represents a halogen atom or a lower alkyl group, b is an integer of 0–4 and Y is a direct bond or a divalent group selected from the group consisting of —CH$_2$—, —CO—, —O—, —S—, —SO$_3$—, —O—Ph—O—, —O—Ph—Ph—O—, —O—Ph—SO$_2$—Ph—O—, —C(CH$_3$)$_2$—Ph—C(CH$_3$)$_2$—, —O—Ph—C(CH$_3$)$_2$—Ph—O— or —O—Ph—C(CF$_3$)$_2$—Ph—O— wherein Ph represents a paraphenylene group or a metaphenylene group.

3. A silicon-containing copolymer as claimed in claim 1, additionally containing the following structural units (IV) and (V):

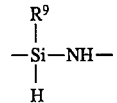
(IV)

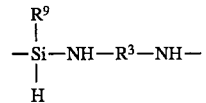
(V)

wherein $R^9$ stands for an alkyl group, an alkenyl group, a cycloalkyl group, an aryl group, an alkylamino group or an alkylsilyl group and $R^3$ is as defined in claim 1, said structural units (I)–(V) being arranged at random and present in molar amounts of p, q, r, m and n, respectively, providing the following relationship:

(m+n)/(p+q)=0.01 to 99

(m+p)/(n+q)=0.01 to 99 r/(m+n+p+q)=0.01 to 99.

4. A method of preparing a silicon-containing copolymer having a number average molecular weight of 500–100,000 and containing the following structural units (I)–(III):

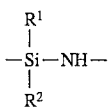
(I)

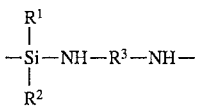
(II)

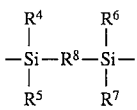
(III)

wherein $R^1$, $R^2$, $R^4$, $R^5$, $R^6$ and $R^7$ stand, independently from each other, for an alkyl group, an alkenyl group, a cycloalkyl group, an aryl group, an aralkyl group, an alkylamino group or an alkylsilyl group and $R^3$ and $R^8$ stand, independently from each other, for a divalent aromatic group, said structural units (I)–(III) being arranged at random and present in molar amounts of p, q and r, respectively, providing the following relationship:

p/q=0.01 to p/r=0.01 to 99, said method comprising reacting a mixture containing an organodihalosilane of the following formula (VI):

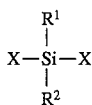
(VI)

wherein $R^1$ and $R^2$ are as defined above and X is a halogen atom and a disilyl compound of the following formula (VII):

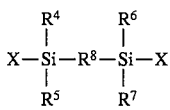
(VII)

wherein $R^4$, $R^5$, $R^6$, $R^7$ and $R^8$ are as defined above and X represents a halogen atom, with a diamine of the following formula (VIII):

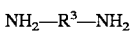
(VIII)

wherein $R^3$ is as defined above, and with ammonia.

5. A method as claimed in claim 4, wherein said mixture further contains an organohydrodihalosilane of the formula (IX):

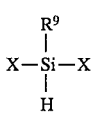
(IX)

wherein $R^9$ stands for an alkyl group, an alkenyl group, a cycloalkyl group, an aryl group, an alkylamino group or an alkylsilyl group, thereby to form a silicon-containing copolymer.

6. A method of preparing a silicon-containing copolymer having a number average molecular weight of 500–100,000 and containing the following structural units (I)–(III):

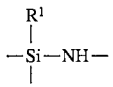
(I)

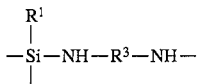
(II)

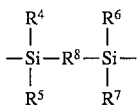
(III)

wherein $R^1$, $R^2$, $R^4$, $R^5$, $R^6$ and $R^7$ stand, independently from each other, for an alkyl group, an alkenyl group, a cycloalkyl group, an aryl group, an aralkyl group, an alkylamino group or an alkylsilyl group and $R^3$ and $R^8$ stand, independently from each other, for a divalent aromatic group.

said structural units (I)–(III) being arranged at random and present in molar amounts of p, q and r, respectively, providing the following relationship:

p/q–0.01 to 99 p/r=0.01 to 99 said method comprising a first step of reacting a mixture of an organodihalosilane of the following formula (VI):

(VI)

wherein $R^1$ and $R^2$ are as defined above and X is a halogen atom and a diamine of the following formula (VIII):

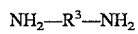
(VIII)

wherein $R^3$ is as defined above with ammonia to obtain an oligomer, and a second step of reacting said oligomer with a disilyl compound having the following formula (VII):

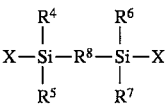
(VII)

wherein $R^4$, $R^5$, $R^6$, $R^7$ and $R^8$ are as defined above and X represents a halogen atom.

7. A method as claimed in claim 6, wherein, an organohydrodihalosilane of the formula (IX):

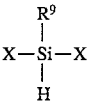
(IX)

wherein $R^9$ stands for an alkyl group, an alkenyl group, a cycloalkyl group, an aryl group, an alkylamino group or an alkylsilyl group is reacted with said mixture in said first step to form the silicon-containing copolymer.

8. A method as claimed in claim 4, wherein the reaction of said mixture with said diamine is preceded by, simultaneous with or followed by the reaction with said ammonia.

9. A method as claimed in claim 6, wherein the reaction of said organodihalosilane with said diamine is preceded by, simultaneous with or followed by the reaction with said ammonia.

* * * * *

UNITED STATES PATENT AND TRADEMARK OFFICE
CERTIFICATE OF CORRECTION

PATENT NO. : 5,596,062
DATED : January 21, 1997
INVENTOR(S) : TASHIRO et al

It is certified that error appears in the above-indentified patent and that said Letters Patent is hereby corrected as shown below:

Col. 4, line 39, "C(CH$_3$)$_2$," should read --"C(CH$_3$)$_2$-,".

Col. 7, line 55, "absolvent" should read --a solvent--.

Col. 14, line 39, "SO$_3$" should read --SO$_2$--.

Col. 15, line 25, after "to" insert --99--.

Signed and Sealed this

Twenty-fifth Day of November, 1997

BRUCE LEHMAN

*Attest:*

*Attesting Officer*   *Commissioner of Patents and Trademarks*